United States Patent [19]

Reilly et al.

[11] Patent Number: 5,009,808

[45] Date of Patent: Apr. 23, 1991

[54] PROCESS FOR PRODUCING ELECTROLUMINESCENT YELLOW ZINC SULFIDE PHOSPHORS

[75] Inventors: Kenneth T. Reilly; Richard G. W. Gingerich; Christopher S. Poss, all of Towanda, Pa.

[73] Assignee: GTE Products Corporation, Stamford, Conn.

[21] Appl. No.: 462,922

[22] Filed: Jan. 11, 1990

Related U.S. Application Data

[63] Continuation of Ser. No. 289,882, Dec. 27, 1988, abandoned.

[51] Int. Cl.$^5$ .............................................. C09K 11/56
[52] U.S. Cl. .............................................. 252/301.60 S
[58] Field of Search .................................. 252/301.6 S

[56] References Cited

U.S. PATENT DOCUMENTS

| | | | |
|---|---|---|---|
| 2,743,239 | 4/1956 | Froelich | 252/301.6 S |
| 3,080,325 | 3/1963 | Aven et al. | 252/301.6 S |
| 3,165,476 | 1/1965 | Wachtel | 252/301.6 S |
| 3,418,248 | 12/1968 | Thornton | 252/301.6 S |
| 4,859,361 | 8/1989 | Reilly et al. | 252/301.6 S |

FOREIGN PATENT DOCUMENTS

| | | | |
|---|---|---|---|
| 55-89381 | 7/1980 | Japan | 252/301.6 S |
| 61-296085 | 12/1986 | Japan | 252/301.6 S |

*Primary Examiner*—Jack Cooper
*Attorney, Agent, or Firm*—Robert E. Walter

[57] ABSTRACT

A phosphor composition consisting essentially of particles of zinc sulfide electroluminescent phosphor activated with from about 0.7% by weight of about 1.3% by weight of manganese, based upon the total weight of the phosphor composition, wherein the electroluminescent emission of the phosphor has an x color coordinate value of from about 0.522 to about 0.532 and a y color coordinate value of from about 0.460 to about 0.470 and an efficiency of greater than about 5.6 lumens per watt at 115V/400 Hz. A solid state process for producing the foregoing phosphor comprises a multiple firing in order to incorporate manganese, chloride and copper ions into the zinc sulfide lattice. Controlled levels of manganese yield highly efficient electroluminescent phosphors.

1 Claim, No Drawings

PROCESS FOR PRODUCING ELECTROLUMINESCENT YELLOW ZINC SULFIDE PHOSPHORS

This is a continuation of copending application Ser. No. 07/289,882, filed on Dec. 27, 1988, now abandoned.

FIELD OF THE INVENTION

This invention relates to electroluminescent zinc sulfide phosphors. More particularly it relates to zinc sulfide phosphors co-activated with manganese, copper and chloride ions having an improved brightness.

BACKGROUND

Compositions of yellow emitting zinc sulfide electroluminescent phosphors are disclosed in the following U.S. Pat. Nos.: 2,743,238; 2,772,242; 3,076,767 and 3,775,173.

U.S. Pat. No. 2,743,238 teaches that a zinc sulfide electroluminescent phosphor can be activated with copper in the range of 0.05% to 1% by weight and manganese in the range of from 0.1% to 10% by weight. The patent also teaches that the brightness of the phosphor is improved by mixing the zinc sulfide with about one third of its weight with zinc oxide, which is washed out of the phosphor with an acetic acid wash subsequent to the firing of the materials. In an alternate process a portion of the zinc sulfide is converted to zinc oxide by controlled oxidation during the firing process.

U.S. Pat. No. 2,772,242 teaches that the addition of a small amount of lead further improves the phosphor and the use of a wash to dissolve free zinc oxide after firing also increases the luminescence. This patent teaches against the use of zinc oxide because of excessive conductivity. From about 0.0001 to about 0.03 gram-atom of manganese per mole of ZnS, corresponding to about 0.01% to about 14.5% by weight of manganese, is the disclosed level of manganese.

U.S. Pat. No. 3,076,767 teaches that when a phosphor is prepared by first forming a zinc sulfide material containing copper and chloride, and thereafter, that material is etched with hydrogen peroxide, then manganese carbonate and copper sulfate are added and the material is refired, the brightness of the resulting phosphor is better than the unetched phosphor. The level of retained manganese is not disclosed, however, it is stated that after drying, 4% manganese (as manganese carbonate) is added and the material is fired at 800° C. The phosphor has an efficiency of 4.4 lumens per watt.

U.S. Pat. No. 3,775,173 teaches that an electroluminescent zinc sulfide phosphor activated with manganese is improved by immersing the activated material in and aqueous solution of a copper salt. The level of retained manganese is disclosed as being from 0.1% to 0.5 % by weight. Manganese chloride is used as the manganese source.

Commerical electroluminescent zinc sulfide phosphors are activated with about 1.3% by weight of manganese, about 0.03% by weight of chloride and about 0.05% by weight of copper and have and a lumens efficiency of about 5.2 lumens per watt when measured at 115/400 Hz using conventional electroluminescent lamps.

SUMMARY OF THE INVENTION

In accordance with one aspect of this invention there is provided an improved phosphor consisting essentially of a zinc sulfide electroluminescent phosphor activated with from about 0.7% by weight to about 1.3% by weight of manganese, based upon the total weight of the phosphor composition, wherein the electroluminescent emission of the phosphor has an x color coordinate value of from about 0.522 to about 0.532 and a y color coordinate value of from about 0.460 to about 0.470 and the phosphor has an efficiency of greater than about 5.6 lumens per watt at 115 V/400 Hz.

In accordance with another aspect of this invention, there is provided a process for producing an electroluminescent phosphor comprising, (a) blending a chloride source, a copper source, and zinc sulfide to form a relatively uniform admixture, (b) heating the resulting admixture at a temperature of from about 1000° C. to about 1300° C. for about 2 to about 8 hours to convert at least a portion of the admixture to a crystalline material containing zinc sulfide at least some chloride ions and copper ions, (c) washing the resulting material with sufficient water to remove at least a major portion of the water soluble material from the crystalline material, (d) drying the crystalline material to produce a relatively moisture-free material, (e) subjecting the moisture-free material to low intensity milling for a sufficient time to change the crystallographic structure of at least a portion of the moisture-free material, (f) blending the cooled material with sufficient manganese carbonate, to achieve a manganese concentration of from about 2.0% to about 3.6% by weight of manganese based on the amount of zinc sulfide to form a second admixture, (g) heating the second admixture at a temperature of from about 750° C. to about 850° C. for about 1.5 to about 3 hours to form an activated material by incorporating from about 0.7% to about 1.3% by weight of manganese into the lattice of the zinc sulfide, (h) washing the activated material with reactive aqueous solutions to remove residual fluxes and excess activator materials and (i) drying the washed material to form an electroluminescent phosphor having increased brightness wherein the electroluminescent emission of the phosphor has an x color coordinate value of from about 0.522 to about 0.532 and a y color coordinate value of from about 0.460 to about 0.470 and the phosphor has an efficiency of greater than about 5.6 lumens per watt at 115 V/400 Hz.

DETAILED DESCRIPTION OF THE PREFERRED EMBODIMENTS

For a better understanding of the present invention, together with other and further objects, advantages, and capabilities thereof, reference is made to the following disclosure and appended claims in connection with the above described description of some of the aspects of the invention.

Production techniques for producing the zinc sulfide electroluminescent phosphors in general comprise the following sequential steps. A first admixture is formed and heated to thereby create a crystalline form of a zinc sulfide material having incorporating at least some chloride ions and copper ions. The resulting heated admixture is washed with water to remove essentially all of the water solubles from the crystalline material and then dried. The dried material is then subjected to low intensity milling for a sufficient time to change the crystallographic structure of at least a portion of the dried material. Thereafter, the material is blended with a specific amount of manganese source to yield a specific lower manganese concentration and is heated to form an activated material incorporating, as retained manganese, a specific level of manganese. The resulting EL phosphor has an emission efficiency of greater than about 5.6 lumens per watt at 115/400 Hz with the emission having specific color coordinates as compared to current commerical materials having an emission efficiency of about 5.2 lumens per watt , thus a significant increase in efficiency is achieved. In general, zinc sulfide is first fired at a temperature of from about 1000° C. to about 1300° C. for about 2 to about 8 hours with a copper source such as copper sulfate and a chloride source, for example, a flux such as the alkali metal chlorides, the alkaline earth chlorides and mixtures thereof. The firing converts a major portion of the admixture into a crystalline material containing zinc sulfide and copper and chloride ions. The resulting material is washed with sufficient water to remove the water soluble material. Generally, when the wash water has a conductivity of less than about 30 micromhos it indicates that essentially all of the water soluble material has been removed. It is preferred that deionized water be used as the wash water. After washing the material is dried and subjected to low intensity milling. It is milled for a sufficient time to change at least a portion of the material from the hexagonal structure to the cubic structure. This milled material is then fired at a lower temperature, that is, from about 750° C. to about 850° C. for about 1.5 hours to about 3 hours, with a sufficient amount of a manganese ion source to yield a manganese concentration of from about 2.0% to about 3.6% by weight of manganese based on the amount of zinc sulfide. Manganese salts of mineral acids are preferred with manganese carbonate being especially preferred. A material incorporating from about 0.7% to about 1.3% by weight of manganese is formed. Thereafter, the manganese containing material is washed with a reactive aqueous solution to remove residual materials. Preferred aqueous solutions include acetic acid, hydrochloric acid and potassium cyanide aqueous solutions. Acetic acid is used to remove unreacted zinc materials from the activated material. Hydrochloric is used to remove unreacted manganese materials from the activated material. Similarly, the activated material is washed with an aqueous solution of potassium cyanide to remove excess copper materials.

The washed material is dried to form an electroluminescent phosphor having increased brightness wherein the electroluminescent emission of the phosphor has an x color coordinate value of from about 0.522 to about 0.532 and a y color coordinate value of from about 0.460 to about 0.470 and the phosphor has an efficiency of greater than about 5.6 lumens per watt at 115 V/400 Hz. If undesired particle size particles are formed the particulate material is subjected to a particle size removal step whereby small and large particles are removed to yield a material having particles ranging from about 15 to about 60 micrometers. It is preferred that the average particle size range from about 25 to about 30 micrometers.

In order to more fully illustrate the subject invention the following detailed examples are presented. All parts, proportions and percentages are by weight unless otherwise indicated.

EXAMPLE I

Cooper sulfate is thoroughly mixed with zinc sulfide powder in an amount sufficient to establish a copper concentration of about 0.05% by weight of zinc sulfide. A chloride flux is blended with the above mixture in an amount equal to about 8% by weight of the zinc sulfide. The flux consists of 3% barium chloride, 3% magnesium chloride, and 2% sodium chloride, each percentage being by weight of zinc sulfide. This admixture is then fired in a covered crucible in air to a temperature of about 1200° C. for five hours and fifteen minutes resulting in a well crystallized starting material. The resulting crystalline material is next washed in water until excess halides are removed as determined by measuring the conductivity of the spent wash water. A conductivity of less than 30 micromhos indicates that the excess materials are removed. The phosphor is then dried at a temperature of about 110° C. The dried material is then milled using low intensity milling for about 1.5 hours which is sufficient to change the crystallographic structure of at least some of the dried material.

This essentially nonelectroluminescent phosphor starting material is next activated by manganese as manganese carbonate, 1% copper as copper sulfate, and 5.8% Zn as zinc sulfate with the phosphor and firing in a covered crucible in air to a temperature of 800° C. for two hours. Each percentage is by weight of phosphor starting material.

After activation, the phosphor is washed with acetic acid/water (0.2/1 by volume), hydrochloric acid/water (0.3/1 by volume), and potassium cyanide/water (1 lb/2.5 gal). The phosphor is then dried at a temperature of about 110° C.

EXAMPLE II

Nine samples of electroluminescent phosphors are prepared by the method of Example I using varying levels of manganese carbonate. All other variables are held constant. Tables I and II show that by reducing the manganese carbonate to about 50 to about 90% of the amount disclosed in U.S. Pat. No. 3,076,767 results in phosphors having a brightness of from about 107.7% to about 113.4% of a phosphor using the amount of manganese disclosed in Example III of the patent mentioned above. Measurements are done at 115 V/400 Hz using conventional electroluminescent lamps.

TABLE I

| TEST NO. | PARTS $MnCO_3$ PER PART ZnS | % $MnCO^3$ of TEST 1 | BRIGHTNESS % of TEST 1 |
| --- | --- | --- | --- |
| 1 | 0.084 | 100 | 100 |
| 2 | 0.076 | 90 | 113.4 |
| 3 | 0.067 | 80 | 113.4 |
| 4 | 0.059 | 70 | 107.7 |
| 5 | 0.050 | 60 | 109.6 |
| 6 | 0.43 | 51 | 107.7 |
| 7 | 0.034 | 40 | 96.2 |
| 8 | 0.025 | 30 | 76.9 |
| 9 | 0.017 | 20 | 55.8 |

TABLE II

| TEST NO. | % MN RETAINED | LUMENS/WATT | COLOR x | y |
| --- | --- | --- | --- | --- |
| 1 | 1.0–1.3 | 5.2 | 0.523 | 0.470 |
| 2 | 1.0–1.3 | 5.9 | 0.537 | 0.460 |
| 3 | 1.0–1.2 | 5.9 | 0.524 | 0.470 |

TABLE II-continued

| TEST NO. | % MN RETAINED | LUMENS/WATT | COLOR x | y |
|---|---|---|---|---|
| 4 | 0.98–1.2 | 5.6 | 0.531 | 0.461 |
| 5 | 0.80–0.98 | 5.7 | 0.522 | 0.469 |
| 6 | 0.72–0.83 | 5.6 | 0.531 | 0.464 |
| 7 | 0.60–0.68 | 5 | 0.517 | 0.464 |
| 8 | 0.48–0.53 | 4 | 0.495 | 0.457 |
| 9 | 0.32–0.35 | 2.9 | 0.455 | 0.464 |

As can be seen from the data in the two tables the retained manganese is to be greater than about 0.7% for the material to have acceptable emission color. While the retained manganese content is essentially identical in Tests 1, 2 and 3 the data shows that if the level of manganese carbonate used is greater than about 0.08 parts per part of zinc sulfide, the brightness or efficiency of the material is decreased.

While there has been shown and described what are considered the preferred embodiments of the invention, it will be obvious to those skilled in the art that various changes and modifications may be made therein without departing from the scope of the invention as defined by the appended claims.

What is claimed is:

1. A process for producing an electroluminescent phosphor consisting essentially of:
   (a) blending a chloride flux, a copper source, and zinc sulfide to form a relatively uniform admixture;
   (b) heating the resulting admixture at a temperature of from about 1000° C. to about 1300° C. for about 2 to about 8 hours to convert at least a portion of the admixture to a crystalline material containing zinc sulfide of a hexagonal crystal structure, at least some chloride ions and copper ions;
   (c) washing the resulting material with sufficient water to remove at least a major portion of the water soluble material from the crystalline material;
   (d) drying the washed material to produce a relatively moisture-free material;
   (e) subjecting the moisture-free material to low intensity milling for a sufficient time to change the crystallographic structure of at least a portion of the moisture-free material from a hexagonal to a cubic structure;
   (f) blending the cooled material, which material is essentially nonelectroluminescent, with copper sulfate and zinc sulfate and sufficient manganese carbonate to achieve a manganese concentration of from about 2.0% to about 3.6% by weight of manganese based on the amount of zinc sulfide to form a second admixture;
   (g) heating the second admixture at a temperature of from about 750° C. to about 850° C. for about 1.5 to about 3 hours to form an activated material containing from about 0.7% to about 1.3% by weight of manganese;
   (h) washing the activated material with acetic acid, hydrochloric acid and potassium cyanide aqueous solutions to remove residual fluxes and excess activator materials; and
   (i) drying the washed material to form an electroluminescent phosphor having increased brightness wherein the electroluminescent emission of the phosphor has an x color coordinate value of from about 0.522 to about 0.532 and a y color coordinate value of from about 0.460 to about 0.470 and the phosphor has an efficiency of greater than about 5.6 lumens per watt at 115 V/400 Hz and a particle size of from about 25 to about 30 micrometers.

* * * * *